Figure 1:
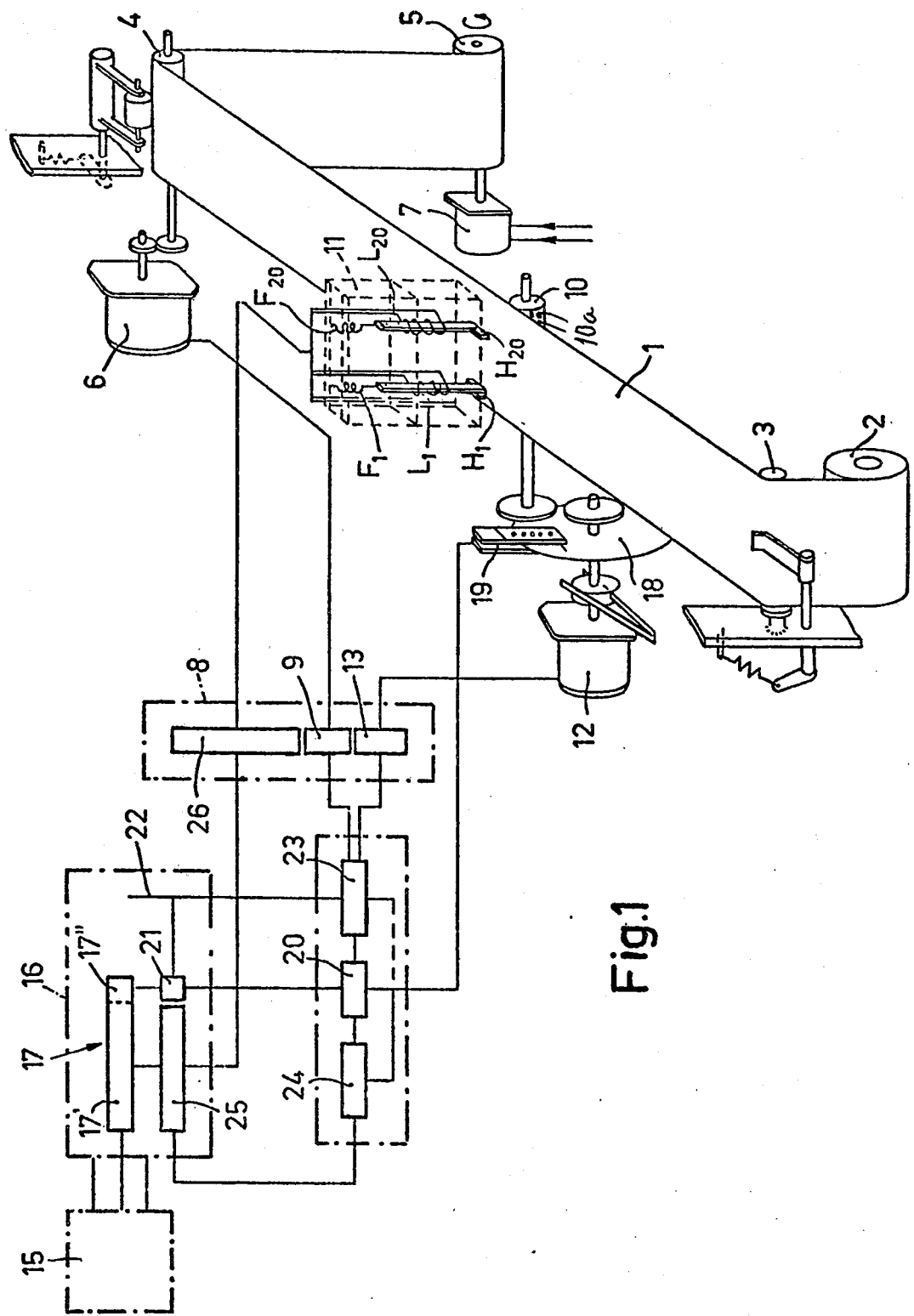

United States Patent [19]

Lundqvist

[11] 4,004,504
[45] Jan. 25, 1977

[54] ARRANGEMENT IN A PRINTER

[75] Inventor: Bengt Oscar Bruno Lundqvist, Bromma, Sweden

[73] Assignee: U.S. Philips Corporation, New York, N.Y.

[22] Filed: Feb. 20, 1974

[21] Appl. No.: 443,975

Related U.S. Application Data

[63] Continuation of Ser. No. 340,766, March 13, 1973, abandoned, which is a continuation of Ser. No. 162,982, July 15, 1971, abandoned.

[30] Foreign Application Priority Data

July 17, 1970 Sweden .......................... 9946/70

[52] U.S. Cl. ............................................. 101/93.03
[51] Int. Cl.² ............................................. B41J 7/92
[58] Field of Search .......... 101/93.03, 93.28–93.36, 101/93.48, 110; 197/12–17

[56] References Cited

UNITED STATES PATENTS

| | | | |
|---|---|---|---|
| 2,935,935 | 5/1960 | Preston et al. ...................... | 101/93 |
| 3,144,821 | 8/1964 | Dreiza ............................... | 101/93.03 |
| 3,172,353 | 3/1965 | Helms ................................. | 101/93 |
| 3,218,965 | 11/1965 | Simons et al. ...................... | 101/93 |
| 3,443,514 | 5/1969 | Schwartz ............................ | 101/93 |
| 3,513,774 | 5/1970 | Pawletko et al. ................... | 101/93 |
| 3,661,077 | 5/1972 | Findlay et al. ...................... | 101/93 |

OTHER PUBLICATIONS

IBM Technical Disclosure Bulletin, vol. 5, No. 11, Apr. 1963, pp. 27–29.

*Primary Examiner*—Edward M. Coven
*Attorney, Agent, or Firm*—Frank R. Trifari

[57] ABSTRACT

An arrangement in a printer of the kind having a type drum with printing types arranged line-wise around the periphery, which drum is mounted on a rotatable shaft, and a number of movable hammers actuated by individual electro-magnets for producing printing of a type upon excitation of the associated magnet by impact of the hammer against the drum. The excitation is effected under cooperation with a position sensing device indicating the position of the shaft, and consequently the type which is in position for printing. A memory device is adapted to produce excitation of predetermined electro-magnets on basis of the information in the memory device and the output signal from the position sensing device.

6 Claims, 2 Drawing Figures

ARRANGEMENT IN A PRINTER

This is a continuation of application Ser. No. 340,766, filed Mar. 13, 1973, now abandoned; which was a continuation of Ser. No. 162,982, filed July 15, 1971, now abandoned.

The invention relates to an arrangement in a printer of the kind having a type drum with printing types arranged line-wise around group periphery, which drum is mounted on a rotatable shaft, and a number of movable hammers actuated by individual electro-magnets for producing printing of a type upon excitation of the associated magnet by impact of the hammer against the drum, the excitation is effected under cooperation with a position sensing device indicating the position of the shaft, and consequently the type which is in position for printing. A memory device is adapted to produce excitation of predetermined electro-magnets on basis of the information in the memory device and the output signal from the position sensing device. If such a printer is to be used as a so called OCR-printer, by which is meant that the types shall be readable by means of an optical reading device, it is a requirement that the printed types are extremely even, both within each type, and in comparison between different types. For achieving required evenness it is necessary that the impact force is matched to the size of the impact surface for each type. The types are, for this purpose, divided into categories each representing a certain required impact force such as those having low character area and normal area as disclosed in U.S. Pat. No. 3,172,353 issued to C. J. Helms for a Variable Force Hammer High Speed Printer. The matching of the impact force to the different categories of types was previously achieved by supplying different voltages to the actuation magnets of the hammers. This solution was, however, difficult and expensive and gave an insufficient accuracy. The reason for this was that, at the high currents used, it was difficult to maintain the voltage on a certain level independently of the total current, which current was dependent upon the number of types to be printed during a certain time interval. The actuation magnet for each hammer may for example require approximately 4 amperes, which in case of twenty hammers will give a maximal current of 80 amperes. The common voltage regulation circuit shall thus stand for 80 amperes at the same time as it shall deliver a number, for example five, different voltage levels. In order to be able to generate the required current amount, the voltage regulation circuit was suitably supplied from a large storing capacitor, the voltage of which varied with the number of printed types per time unit, which further contributed to making the voltage regulation more difficult.

The present invention solves the above mentioned problem, and gives a device, which in spite of its essentially greater simplicity, will produce an accurate regulation of the impact force in correspondence to the different categories of types.

In order that there be substantially even printing, selectively actuated time determining elements are associated with the different categories of types and are activated in dependence on the type to be printed. The which elements will produce excitation of the actuation magnets for the hammers during a given excitation time duration which is matched to the category of the actual type.

According to the invention, the pulse width of the pulses fed to the actuation magnets for the hammers is controlled. This can be accomplished with high accuracy by means of simple circuits of the type such as monostable flip-flops or the like. The control according to the invention requires that current through the actuation magnets be kept substantially constant. This can also be achieved in a simple manner by means of constant current generators, for example, supplied from a common storing capacitor. As the current generators can tolerate an essential variation in the feeding voltage without influencing the delivered current, all voltage regulation will be superfluous. The control device is simple, inexpensive and meets the requirements of an effective force control.

The invention is illustrated in the accompanying drawings, in which

Figure 2:
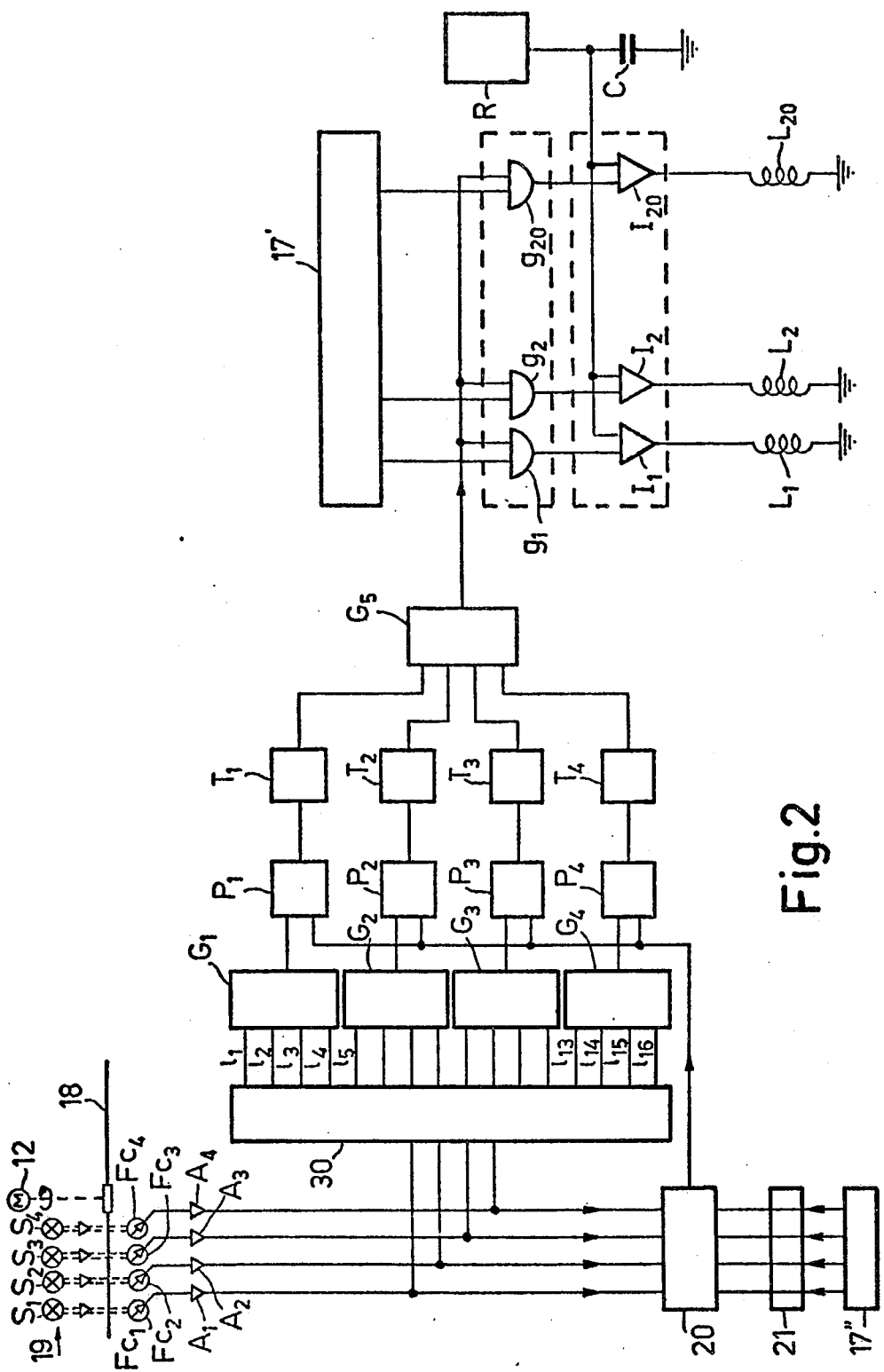

FIG. 1 shows a perspective view of a printer, in which the principles of the invention can be used, the driving circuits being shown in shape of a block diagram, and FIG. 2 shows a block diagram for an arrangement according to the invention for automatic adjustment of the impact force of the hammers in the printer according to FIG. 1 by selection of different excitation time durations for the actuation magnets of the hammers.

According to FIG. 1 a printing paper strip 1 with copy paper is driven from a supply roll —via a break roll 3 and a driving roll 4 to a storing roll 5. The paper strip is driven intermittently by means of a stepping motor 6 and the storing roll is actuated continuously by a motor 7. The stepping motor 6 receives actuation pulses from an amplifier 9 included in an amplifier unti 8. At a printing station there is immediately below the strip a type drum 10 and opposite the drum on the other side of the strip at a certain distance from the same there is a printing hammer unit 11. The drum is provided on its periphery with a number of types 10a arranged along axial and peripheral lines, types of the same kind being arranged on one and the same axial line. In the given example it is assumed that the drum has 16 different types arranged round the periphery and 20 axial type positions. The drum is driven by a stepping motor 12, which receives actuation pulses from an amplifier 13 in the unit 8.

The unit 11 comprises as many hammers $H_1-H_{aromatic}$ as the number of type positions in the axial acid on the drum, i.e. twenty, with one hammer acyl"opposite each type position. The hammers are supported with linear movability and are controlled by electromagnetic windings $L_1-L_{20}$. That part of each hammer which is above the associated winding is made of magnetic material, whereby when the winding carries a current, the hammer will move downwardly against the strip and impact against the drum. Resetting of the hammers is effected by means of tension springs $F_1-F_{20}$. In order to enable a compact arrangement of the hammers following from the small distances between the type positions, the hammers are shaped as L:s and arranged pairwise such that one hammer in each pair is situated at the front wall of unit 11 and the other hammer at the rear wall, the impact surface being formed by the horizontal part of the L projecting to the centre of the unit.

Order for printing comes from a data equipment 15 which is connected to an interface unit 16. Within the interface unit, printing data are fed in successive order into a shift register 17 comprising in total 24 stages. In the four last stages 17″ of the register a control word is written, which represents the type to be printed. In the first 20 stages 17' of the register information is stored about that position or those positions, where the type in question shall be printed. A binary digit "1" in a certain stage of the shift register means that the type given by the control word in the four last stages of the shift register shall be printed in the position having the same order number as the stage in question.

The angular position of the drum and thereby the line of types, which is in position for printing, is sensed by means of a position sensing device having the shape of a code disk 18, which is fixedly coupled with the drum 10 and cooperates with a code reader 19. The code disk 18 has different codes arranged along radial lines on the disk, for example in the form of perforations, each code representing a certain line of types on the drum and thereby a certain type. The information from the code disk is fed by the code reader to a comparison device 20, in which it is compared with the control word in the four last stages 17'' of the shift register 17. The control word is fed to the comparison device 20 through gates 21 in the interface unit 16 which are opened by a start signal on an output 22 generated within the interface unit. The start signal appears when feeding of data into the shift register is terminated. The start signal is also fed to a motor control unit 23. When the start signal appears the control unit starts to produce drive pulses, which are applied to the stepping motor 12 through the drive amplifier 13 so that the motor starts to step the drum forward. At the moment when the information given by the code reader coincides with the information in the four last stages of the shift register the comparison device delivers a stop pulse to the control unit so that the flow of driving pulses to the stepping motor ceases and the motor stops. The drum is now in a position in which that type, which is represented by the control word in the shift register is in position for printing. The comparison device also delivers a pulse to an opening logic and pulse generating device 24, which in a manner more monoazo described hereinafter delivers a pulse of correct length to gates 25 connected to a reading output for the 20 first stages in the shift register. 17. That gate or those gates which are connected to the output of a stage, which contains a binary "1" will lead a voltage pulse of the correct time duration representing this binary "1" further to a hammer actuation amplifier 26, which in turn will excite the associated hammer winding. That hammer or those hammers which have the same order number as those stages in the first part of the shift register 17, which have a binary "1" written into the same, will thus be activated and impacted against the drum with the printing strip lying therebetween and the type in question will be printed on the strip. When the printing is terminated a signal from the data equipment will start the feeding of new data into the shift register. A new start signal appears when the feeding into the shift register is terminated and the course will be repeated for the next type. After rotation of the drum one whole revolution all types have been treated and the line on the printing strip is complete.

The motor control unit also feeds pulses via driving amplifier 9 to the stepping motor 6 for the strip so that, before each printing of a new line, it is automatically driven a distance equal with the line distance on the strip.

FIG. 2 shows a block diagram for metallisable detail of the device according to FIG. 1 relating to the control circuits, which are arrangesd for delivering actuation pulses the benzene the magnet windings of the printing hammers. In FIG. 2 one can recognize the driving motor 12 for the drum, the code disk 18 with code reader 19 and the comparison device 20. The code reader 19 consists according to FIG. 2 of radially arranged light sources $S_1$–$S_4$ situated on one side of the disk and photocells $Fc_1$–$Fc_4$ arranged opposite the light sources on the opposite side of the code disk. $A_1$–$A_4$ are reading amplifiers adapted to amplify the pulses from the photocells. The amplified pulses from the photocells are led on the one hand to the comparison device 20 and on the other hand to 1-of-16 decoder 30 within the logic and pulse generating device 24 shown in FIG. 1. This decoder has 16 outputs $1_1$–$1_{16}$ and delivers, for each setting of the code disk, a predetermined voltage at one of the outputs, the order number of the output having this predetermined voltage being representative for the actual code read from the disk. Each output from the decoder corresponding to a certain code thus represents a certain type on the drum. The outputs $1_1$–$1_{16}$ of the decoder are according to FIG. 2 divided into groups each group containing four outputs representing four types. The voltages on the outputs in each group are added in respective OR-gates $G_1$–$G_4$. Each OR-gate output is applied to a respective AND-gate, $P_1$–$P_4$. The dividing into groups is made such that outputs representing types of a category, having substantially the same impact surface area, are included in one and the same group. Thus, in FIG. 2 it can be assumed that the outputs of the first group leading to OR-gate $G_1$ represent types having the smallest impact surface area. The next group contains types having the next size of impact surface etc. In the last group represented by OR-gate $G_4$ types are included, which have the largest impact surface. Each of the AND-gates $P_1$–$P_4$ following after the OR-gates receive also receives an opening pulse from the comparison device 20 when a type is in position for printing. An output pulse from one of AND-gates $P_1$–$P_4$ serves to trigger an associated pulse generator $T_1$–$T_4$. The pulse generators, which may for example be shaped as monostable flip-flops, deliver pulses with accurately determined length, the pulse length being different for different generators. In the given example thus the first generator $T_1$ delivers the shortest pulse and the generator $T_4$ delivers the longest pulse. The output pulses
the generators are led through an OR-gate $G_5$ to 20 AND-gates $g_1$—$g_{20}$ (shown as gates 25 in FIG. 1), which gates at a second input receive voltage from the individual stages in the first part 17' of the shift register 17. That stage or those stages in the shift register which have a binary "1" written into the same will deliver a voltage representing this binary digit to an associated constant-current generator $I_1$–$I_{20}$ within hammer actuation amplifier 26 shown in FIG. 1 for exciting the same. The current generators receive feeding voltage from a common storing capacitor C, which is kept charged from a rectifier R. The excitation time duration is determined by the pulse generator which is activated. During the excitation time the current generator or generators, which are excited, will deliver a constant magnetization current to the associated magnet winding $L_1$–$L_{20}$ so that the hammer will impact against the drum. The excitation time is thus adapted such that substantially constant impact force will be obtained as counted per unit area of the impact surface; the produced types will have an even force distribution and will be readable by an optical reading device. Due to different current supply from the capacitor C in dependence on the number of printed types during a certain time interval the feeding voltage to the current generators $I_1$–$I_{20}$ will vary from time to time. The current generators, which may be of a known construction per se, will, however, deliver a substantially constant current independently of the variations in the input voltage within given limits. In an example the voltage across the capacitor can vary between 36 and 28 volts and the current delivered by each current generator can amount to 4 amperes. In all cases the excitation time is shorter than the time required for the hammer to come to impact against the drum, whereby, when the impact occurs, the hammers are only influenced by the inertia power built up during the foregoing excitation.

Instead of controlling the activation of the different time circuits directly from the position type sensing device, as in the shown example, it is also possible to let the activation of the time circuits occur in dependence on information stored in the shift register or the memory of the computer relating to the type to be printed. The different excitation intervals for the magnet windings of the hammers can also be introduced in any suitable manner, for example by means of a blocking input on all activation amplifiers or current generators for the magnet windings or via a common AND-gate, which serves to supply excitation current to the windings. The time elements can also be shaped in different manner and for example be formed by one single monostable flip-flop having in its time determining RC-circuit different resistances or capacitors which are made effective in dependence on the category of type.

What is claimed is:

1. In a printer of the kind having a type drum with types arranged linewise around a periphery thereof, a rotatable shaft with said drum being mounted thereon, means for rotating the shaft, a number of movable hammers mounted for producing printing by impact of the hammers against the types on the drum, a respective electromagnet associated with each hammer for activating said hammer, position sensing means for producing a signal indicative of the position of the shaft and of a type which is in position for printing, said types being divisible into a plurality of categories, each category requiring a different hammer impact force for even printing, means for indicating which category the type in position for printing is in, and a memory device for storing information for selecting a type to be printed and electromagnets to be excited, the improvement comprising means for selectively exciting said electromagnets in response to information stored in the memory device, said exciting means including a source of constant current for exciting said electromagnets, and time determining means responsive to said indicating means for varying the excitation time duration of said electromagnets according to the required hammer impact force of the indicated category, said excitation time duration being less than the time required for a hammer to impact against said drum.

2. A printer according to claim 1, wherein the constant current source comprises individual constant current generators connected to the respective electromagnets, and a common voltage source for supplying voltage to said generators.

3. A printer according to claim 1, wherein said position sensing means has a plurality of outputs each associated with presence of a particular type in position for printing, said time determining means comprises a plurality of time determining elements, and said exciting means further includes means for connecting outputs of said position sensing means associated with types of the same category to a time determining element.

4. A printer according to claim 3, wherein said output connecting means comprises a plurality of AND-gates, the output of each AND-gate being connected to control the activation of a respective time determining element, comparison means for comparing the signal indicative of the position of the shaft and of the type which is in position for printing with information stored in the memory device representing the type to be printed, said comparison means having an output responsive to coincidence between said indicative signal and said information stored in said memory, and means connecting said comparison means output to an input of each of said AND-gates.

5. A printer according to claim 4 wherein each of said time determining elements comprises a monostable flip-flop having a different running time.

6. A printer according to claim 4, wherein said time determining elements comprise impedances of different values, and said time determining means comprises means for selectively switching at least one of said impedances into a time-determining RC-circuit in response to an output signal from one of said AND-gates, and a single monostable flip-flop having a running time determined by said RC-circuit.

* * * * *

UNITED STATES PATENT AND TRADEMARK OFFICE
CERTIFICATE OF CORRECTION

PATENT NO. : 4,004,504
DATED : January 25, 1977
INVENTOR(S) : ARRANGEMENT IN A PRINTER It is certified that error appears in the above-identified patent and that said Letters Patent are hereby corrected as shown below:

Column 1, line 9, "group" should be --the--.

Column 2, line 47, "acyl" should be --situated--.

Column 3, line 38, "a pulse to an opening logic" should be --an opening pulse to a logic--;

line 40, "monoazo" should be --closely--;

line 66, "metallisable detail" should be --a detail-- line 68, "arrangesd" should be --arranged--.

Column 4, line 1 "the benzene" should be --to the--;

line 36, before "also receives" delete "receive"

line 46, after "pulses" insert --from--.

Signed and Sealed this

Third Day of May 1977

[SEAL]

Attest:

RUTH C. MASON
*Attesting Officer*

C. MARSHALL DANN
*Commissioner of Patents and Trademarks*